United States Patent [19]

Fickelscher

[11] 3,997,339
[45] Dec. 14, 1976

[54] ALUMINUM ALLOY FOIL FOR HIGH VOLTAGE ELECTROLYTIC CAPACITORS

[75] Inventor: Horst Fickelscher, Heidenheim, Germany

[73] Assignee: Siemens Aktiengesellschaft, Berlin & Munich, Germany

[22] Filed: Jan. 16, 1975

[21] Appl. No.: 541,510

[30] Foreign Application Priority Data
Jan. 25, 1974  Germany .......................... 2403626

[52] U.S. Cl. .................................. 75/138; 75/146; 317/230
[51] Int. Cl.² ........................................ C22C 21/00
[58] Field of Search ................. 317/230; 29/183.5; 75/138, 146

[56] References Cited
UNITED STATES PATENTS

| | | | |
|---|---|---|---|
| 2,886,432 | 5/1959 | Schmitt et al. | 75/138 |
| 3,321,306 | 5/1967 | Reding et al. | 75/146 |
| 3,351,442 | 11/1967 | Hooper | 29/183.5 |
| 3,464,909 | 9/1969 | Yanagida et al. | 75/146 X |

Primary Examiner—L. Dewayne Rutledge
Assistant Examiner—E. L. Weise
Attorney, Agent, or Firm—Hill, Gross, Simpson, Van Santen, Steadman, Chiara & Simpson

[57] ABSTRACT

An aluminum alloy foil for a high voltage electrolytic capacitor in which the foil contains one or more of the elements, antimony, barium, and zinc in quantities 5 to 200 ppm. and at the most 0.5 ppm. of lead and bismuth plus at the most 2 ppm. of calcium and chromium. The resulting foil has a greatly improved etching pore density.

1 Claim, 8 Drawing Figures ced structure in the aluminum foil after the recrystallization

ALUMINUM ALLOY FOIL FOR HIGH VOLTAGE ELECTROLYTIC CAPACITORS

BACKGROUND OF THE INVENTION

Field of the Invention

The field of art to which this invention pertains is electrolytic capacitors and, in particular, to aluminum foils for use in high-voltage electrolytic capacitors wherein means are provided to improve the etching pore density and hence the capacitance of the resulting device.

SUMMARY OF THE INVENTION

It is an important object of the present invention to provide an improved electrolytic capacitor.

It is also an object of the present invention to provide an aluminum foil for an electrolytic capacitor wherein the aluminum foil has improved etching pore density due to the addition of prescribed quantities of antimony, barium and zinc.

It is an additional object of the present invention to provide an aluminum foil for a high-voltage electrolytic capacitor as described above wherein predetermined quantities of lead and bismuth as well as calcium and chromium are added to the aluminum foil.

It is a further object of the present invention to provide an aluminum foil for a high-voltage electrolytic capacitor as described above wherein one or more of the elements of antimony, barium and zinc are added to the foil in the quantities of 5 to 200 ppm. and wherein the lead and bismuth are added to the foil with a maximum of 0.5 ppm. and 2 ppm., respectively.

It is another object of the present invention to provide an aluminum foil for a high-voltage electrolytic capacitor which contains one or more of the elements, antimony, barium and zinc in quantities of 20 to 50 ppm.

It is also an object of the present invention to provide an aluminum foil as described above wherein the aluminum has a purity of at least 99.9%.

These and other objects, features and advantages of the present invention will be understood in greater detail from the following description and associated drawings.

DESCRIPTION OF THE PREFERRED EMBODIMENT

Figure 1:
FIG. 1 is a photograph of the surface of an undoped aluminum foil.

The present invention relates to an aluminum foil for high voltage electrolytic capacitors. Aluminum foils for electrolytic capacitors are generally roughened by means of an electrolytic etching technique in order to increase the capacitance before being provided by an nodic forming operation with an oxide film which acts as a dielectric. A critical factor involving the capacitance of the etched and subsequently formed high voltage foil is its so-called etching pore density, the etching properties of the foil being improved by the development of a cubic structure during recrystallization of the aluminum.

Despite uniformity of conditions during the electrolytic etching operation, it is not always possible, considering aluminum foils from different batches, to obtain identical etching pore densities and cubic structures.

An object of the present invention is to provide an aluminum alloy foil for electrolytic capacitors, which has improved etching properties. This object is achieved in accordance with this invention in that the foil, in addition to aluminum, contains one or more of the elements, antimony, barium and zinc, in quantities of 5 to 200 ppm. and at the most 0.5 ppm. of lead and bismuth plus at the most 2 ppm. of calcium and chromium. The ppm. indication here relates to the weight.

The advantages of the invention will be illustrated by making reference to the drawings and to examples set forth herein.

In the drawing, 1000 × magnification pictures of the surfaces of aluminum foils doped to different extents, under uniform etching conditions, have been illustrated. The foils of 99.99% aluminum were subjected, prior to etching, to a recrystallization annealing treatment (1 hour at 600° C, air being excluded). Etching was carried out in a 1n sodium chloride bath at 90° C. The etching current was in each case 40 mA/cm$^2$ of foil, and the electrolytic charge transfer was 40 C/cm$^2$ of foil.

Figure 2:
FIG. 2 is a photograph of an aluminum foil doped with 40 ppm. of zinc.
Figure 3:
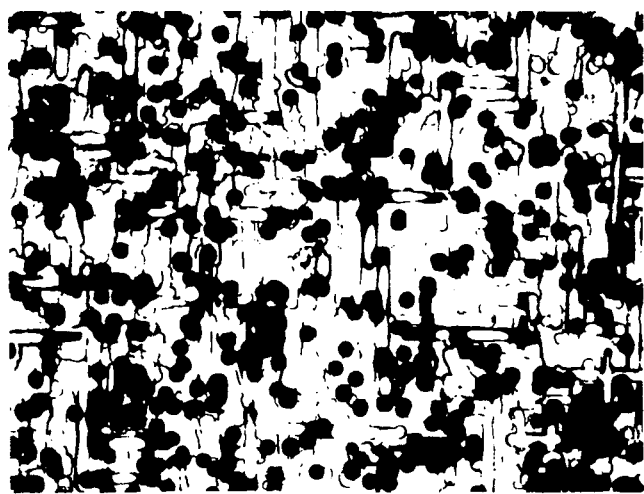
FIG. 3 is a photograph of an aluminum foil doped with 40 ppm. of antimony.
Figure 4:
FIG. 4 is a photograph of an aluminum foil doped with 40 ppm. of barium.

FIG. 1, by way of comparison, illustrates a picture of the surface of an undoped aluminum foil. In FIG. 2, the illustration shows an aluminum foil doped with 40 ppm. of zinc. FIG. 3 shows an aluminum foil doped with 40 ppm. of antimony and FIG. 4 shows an aluminum foil doped with 40 ppm. of barium.

These figures directly illustrate the advantages of the technique proposed in accordance with the invention, namely that of carrying out doping with zinc, antimony and barium. Tests have shown that, for example, the zinc content cannot be varied in an arbitrary manner. Contents of less than 10 ppm. (normally contained in the refined product), and concentrations of greater than 200 ppm., are sufficient to reduce the etching pore density. The same can be assumed for antimony and barium.

Figure 5:
FIG. 5 is a photograph of an aluminum foil doped with 40 ppm. of calcium.
Figure 6:
FIG. 6 is a photograph of an aluminum foil doped with 40 ppm. of chromium.
Figure 7:
FIG. 7 is a photograph of an aluminum foil doped with 40 ppm. of lead.
Figure 8:
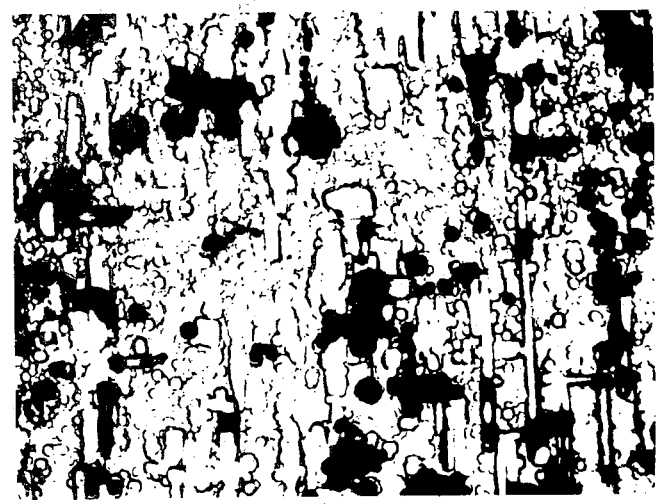
FIG. 8 is a photograph of an aluminum foil doped with 40 ppm. of bismuth.

FIG. 5 illustrates an aluminum foil doped with 40 ppm. of calcium. FIG. 6 shows a foil doped with 40 ppm. of chromium. FIG. 7 shows one doped with 40 ppm. of lead, and FIG. 8 shows one doped with 40 ppm. of bismuth. FIGS. 5 to 8 illustrate how the elements calcium, chromium, lead and bismuth in the said quantities produce a reduction in the etching pore density which is responsible for determining capacitance. In addition, lead, compared with the other doping agents, yields a substantially smaller proportion of cubic structure in the aluminum foil after the recrystallization annealing treatment. These elements, therefore, must not be present in the aluminum foils in anything more than the concentrations specified in accordance with the invention.

In the following examples, a comparison of the specific capacitance of the variously doped aluminum foils has been made.

EXAMPLE 1

A roll-hardened foil of 99.9% aluminum with a content of 40 ppm. zinc, was annealed at 600° C for 1 hour, air being excluded. Thereafter, it was electrolytically etched in a 2.5 normal sodium-chloride solution at 90° C using figures of 80 mA/cm$^2$ of foil and 60 C/cm$^2$ of foil. Thereafter, forming was carried out in a conventional fashion in a 5% boric acid bath at 90° C using a bath voltage of 400 V. The specific capacitance of the foil was 0.44 μF/cm$^2$ of foil.

EXAMPLE 2

A roll-hardened aluminum foil (99.99% aluminum) with a 40 ppm. antimony content, was treated in the same fashion as the specimen of Example 1. The specific capacitance was 0.46 μF/cm$^2$ of foil.

EXAMPLE 3

A roll-hardened aluminum foil (99.99% aluminum) containing 40 ppm. of barium, was treated in the same fashion as the specimen described in Example 1. Its specific capacitance was 0.49 μF/cm$^2$ of foil.

EXAMPLES 4 to 7

Roll-hardened doped foils of 99.99% aluminum with contents of 40 ppm. calcium or 40 ppm. chromium or 40 ppm. lead or 40 ppm. bismuth, were treated in the same fashion as specified in Examples 1 to 3. The specific capacitances were respectively 0.39 or 0.41 or 0.37 or 0.39 μF/cm$^2$ of foil.

From Examples 1 to 3, it is evident that the operation of doping of the zinc, antimony and barium, proposed in accordance with the invention yields significantly higher specific capacitances than the doping with calcium, chromium, lead and bismuth proposed in Examples 4 to 7.

Accordingly, the present invention provides an improved aluminum alloy foil for high voltage electrolytic capacitors by means of the above-specified measures of doping of the indicated items from selected groups of elements.

What I claim is:

1. An electrolytically etched aluminum alloy foil for a high voltage electrolytic capacitor comprising an aluminum foil containing an item selected from the group consisting of antimony, barium, and zinc in quantities of 5 to 220 ppm, an item selected from the group consisting of lead and bismuth in quantities of up to 0.5 ppm and an item selected from the group consisting of calcium and chromium in quantities of up to 2 ppm, the barium of said group of antimony, barium, and zinc being present in quantities of 20 to 50 ppm.

* * * * *